United States Patent
Lyren et al.

(10) Patent No.: US 8,424,048 B1
(45) Date of Patent: Apr. 16, 2013

(54) PORTABLE ELECTRONIC DEVICE FOR RECEIVING AND PLAYING FEATURE LENGTH MOVIES

(76) Inventors: Philip Scott Lyren, Bangkok (TH); Robert Louis Lyren, Bangkok (TH)

( * ) Notice: Subject to any disclaimer, the term of this patent is extended or adjusted under 35 U.S.C. 154(b) by 1013 days.

(21) Appl. No.: 11/356,952

(22) Filed: Feb. 18, 2006

(51) Int. Cl.
*H04N 7/173* (2011.01)
*H04N 7/16* (2011.01)

(52) U.S. Cl.
USPC .............. 725/106; 725/62; 725/87; 725/99; 725/100; 725/104

(58) Field of Classification Search ............ 725/62, 725/87, 99–100, 104, 106, 112
See application file for complete search history.

(56) References Cited

U.S. PATENT DOCUMENTS

| | | | |
|---|---|---|---|
| 5,537,314 A | 7/1996 | Kanter | |
| 5,576,755 A | 11/1996 | Davis et al. | |
| 5,822,023 A | 10/1998 | Suman et al. | |
| 6,029,141 A | 2/2000 | Bezos | |
| 6,049,778 A | 4/2000 | Walker et al. | |
| 6,701,355 B1 | 3/2004 | Brandt et al. | |
| 6,704,027 B2 | 3/2004 | Nakano | |
| 6,876,983 B1 * | 4/2005 | Goddard | 705/37 |
| 6,920,428 B2 | 7/2005 | Greene | |
| 6,980,962 B1 | 12/2005 | Arganbright | |
| 7,174,312 B2 | 2/2007 | Harper et al. | |
| 7,176,987 B2 | 2/2007 | Liu | |
| 7,200,423 B2 | 4/2007 | Bum | |
| 7,616,750 B2 | 11/2009 | Cadiz et al. | |
| 7,924,395 B2 | 4/2011 | Moore et al. | |
| 2002/0124252 A1 | 9/2002 | Schaefer | |
| 2002/0180864 A1 | 12/2002 | Nakamura et al. | |
| 2002/0188527 A1 | 12/2002 | Dillard et al. | |
| 2003/0009385 A1 | 1/2003 | Tucciarone | |
| 2003/0014320 A1 | 1/2003 | Thompson et al. | |
| 2003/0046152 A1 | 3/2003 | Colas et al. | |
| 2003/0055717 A1 | 3/2003 | Badugu et al. | |
| 2003/0083961 A1 | 5/2003 | Bezos et al. | |
| 2003/0130906 A1 | 7/2003 | Maari | |
| 2003/0149628 A1 | 8/2003 | Abbosh et al. | |
| 2003/0191687 A1 | 10/2003 | Pavone | |
| 2003/0204849 A1 | 10/2003 | Watanabe | |
| 2004/0002904 A1 | 1/2004 | Deas et al. | |

(Continued)

FOREIGN PATENT DOCUMENTS

| | | |
|---|---|---|
| JP | 2005209011 | 8/2005 |
| WO | WO 2004047360 | 6/2004 |
| WO | WO 2004056104 | 7/2004 |

OTHER PUBLICATIONS

"Fox Broadcasting Looks at Launching Satellite Networks", Nov. 25, 1991, Cable World Magazine, v3, n47, p. 3.*

(Continued)

*Primary Examiner* — Chris Parry
*Assistant Examiner* — Gigi L Dubasky

(57) ABSTRACT

One embodiment is a handheld portable cellular device that receives and plays feature length movies. In one exemplary embodiment, a multifunctional handheld portable cellular device (HPCD) has a body, a display and a processor. The processor plays a feature length movie on the display. The HPCD orders, via a wireless connection to a network, the feature length movie before a public release date of the feature length movie, and plays the feature length movie on the display before the public release date.

22 Claims, 3 Drawing Sheets

U.S. PATENT DOCUMENTS

| | | | |
|---|---|---|---|
| 2004/0012613 A1* | 1/2004 | Rast | 345/632 |
| 2004/0027496 A1 | 2/2004 | Morales | |
| 2004/0075589 A1 | 4/2004 | Wang et al. | |
| 2004/0214541 A1 | 10/2004 | Choi | |
| 2004/0259499 A1 | 12/2004 | Oba et al. | |
| 2005/0044025 A1* | 2/2005 | Tutty et al. | 705/35 |
| 2005/0070327 A1 | 3/2005 | Watanabe | |
| 2005/0080884 A1 | 4/2005 | Siorpaes et al. | |
| 2005/0177386 A1* | 8/2005 | Essa | 705/1 |
| 2005/0177857 A1* | 8/2005 | Park et al. | 725/100 |
| 2005/0216940 A1* | 9/2005 | Black | 725/87 |
| 2005/0227669 A1* | 10/2005 | Haparnas | 455/410 |
| 2005/0250552 A1 | 11/2005 | Eagle et al. | |
| 2005/0278750 A1 | 12/2005 | Grossman et al. | |
| 2006/0015649 A1 | 1/2006 | Zutaut et al. | |
| 2006/0015664 A1 | 1/2006 | Zhang | |
| 2006/0031886 A1 | 2/2006 | Bae et al. | |
| 2006/0088281 A1 | 4/2006 | Hasegawa | |
| 2006/0090207 A1 | 4/2006 | Tomita et al. | |
| 2006/0178901 A1* | 8/2006 | Cooper | 705/1 |
| 2006/0203758 A1 | 9/2006 | Tee et al. | |
| 2006/0236258 A1 | 10/2006 | Othmer et al. | |
| 2006/0247976 A1 | 11/2006 | Posokhow et al. | |
| 2006/0248113 A1 | 11/2006 | Leffert et al. | |
| 2006/0271973 A1 | 11/2006 | Jerding et al. | |
| 2007/0010261 A1 | 1/2007 | Dravida et al. | |
| 2007/0039025 A1 | 2/2007 | Kraft et al. | |
| 2007/0079014 A1 | 4/2007 | Volk et al. | |
| 2007/0086724 A1 | 4/2007 | Grady et al. | |
| 2007/0088616 A1 | 4/2007 | Lambert et al. | |
| 2007/0089124 A1* | 4/2007 | Bond | 725/8 |
| 2010/0186025 A1* | 7/2010 | Thomas et al. | 725/5 |

OTHER PUBLICATIONS

Andersen, Kurt, "The Future is looking too cool", Jun. 14, 1993, Time 141, p. 77.*

Olsen, Stephanie; "Star Wars clones appear on Net"; Jul. 25, 2002; http://news.cnet.com/Star-Wars-clones-appear-on-Net2100-1023 3-909507.html.

http://web.archive.org/web/20040624124424/http://www.videounivers.com/ [published Jun. 24, 2004].

http://web.archive.org/web/20050729082448/http://www.videouniverse.com/ [published Jul. 29, 2005].

http://web.archive.org/web/20040821 021354/http://videouniverse.com/ [published Aug. 21, 2004].

http://web.archive.org/web/20040526093548/http://videouniverse.com/ [published May 26, 2004].

Edward Jay Epstein; "Hollywood's Death Spiral" part 1 of 2 at www.slate.com/articles/arts/the_hollywood_economist/2005/07/hollywoods_death_spiral.html; Jul. 25, 2005.

Edward Jay-Epstein; "Hollywood's Death Spiral" part 2 of 2 at www.slate.com/articles/arts/the_hollywood_economist/2005/08/hollywoods_death_spiral_part_2.html: Aug. 1, 2005.

Ronald Grover; Bloomberg Businessweek, "What's Driving the Box Office Batty" at www.businessweek.com/magazine/content/05_28/b3942101.htm; Jul. 11, 2005.

Kathy Clayton "Fox Broadcasting Looks at Launching Satellite Networks" in Cable World Magazine, v3, n47, p. 3, issued on Nov. 25, 1991.

Kurt Andersen "The Future is Looking Too Cool" in Time, Spectator Column, Jun. 14, 1993.

* cited by examiner

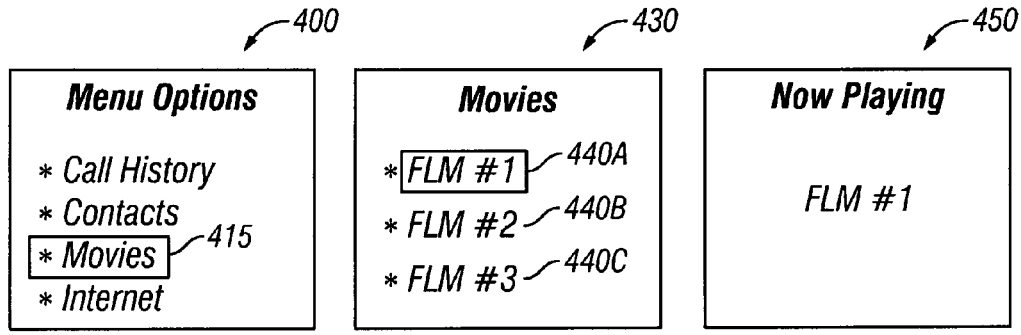
FIG. 4A  FIG. 4B  FIG. 4C
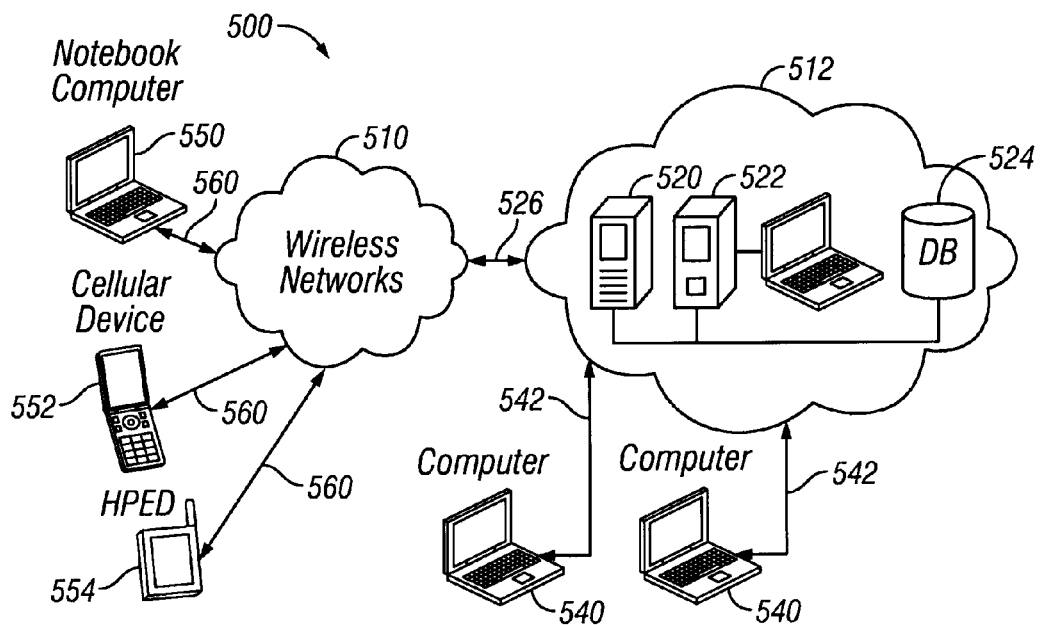
FIG. 5

PORTABLE ELECTRONIC DEVICE FOR RECEIVING AND PLAYING FEATURE LENGTH MOVIES

CROSS-REFERENCE TO RELATED APPLICATIONS

This application relates to U.S. application Ser. No. 11/343,634 filed Jan. 31, 2006; U.S. application Ser. No. 11/368,764 filed Mar. 6, 2006; U.S. application Ser. No. 11/392,918 filed Mar. 29, 2006; U.S. application Ser. No. 11/396,524 filed Apr. 3, 2006; U.S. application Ser. No. 11/399,850 filed Apr. 8, 2006; and U.S. application Ser. No. 11/434,615 filed May 16, 2006.

BACKGROUND

Traditionally, feature length movies are first released only in cinemas. Such movies open on the same day in various theaters throughout the country. These movies have a release date that specifies the day on which the public can go to the theater to watch the movie for the first time. Depending on its popularity, a movie can play in cinemas for weeks or months. During this time, the public can only view the movie in a theater. The movie is simply not available on digital video disk (DVD) or television until months later.

One drawback with this traditional model (i.e., only showing movies initially in cinemas) is that other venues and media are not used while the movie plays in the cinema. These other venues represent great potential revenue for the movie. For instance, some people want to see the movie, but will only watch the movie on a DVD at home, on a personal computer, or in a private environment not in a movie theater. Many of these people will never go to see the movie in the theater and thus represent lost revenue for the movie. Granted, such people have the option of buying or renting the movie when it is released on DVD many months later. At this later date, however, many of these people will have lost interest in the movie and simply never buy or rent it.

Another drawback with this traditional model is that many movie goers would place significant value on viewing feature length movies before others. In other words, some movie viewers are willing to pay extra to watch a movie before the movie is available to the general public. The traditional model does not cater to showing the movie first to a specific group of public movie goers since feature length movies are generally available to all movie goers on the release date.

Another drawback with this traditional model is that revenue is lost if feature length movies are not adequately tied to the sale of other goods and services. In the traditional model, movie goers can view feature length movies in a theater without buying a good or service that is associated with the movie.

SUMMARY

One embodiment is a handheld portable cellular device that receives and plays feature length movies. One embodiment is a handheld portable cellular device that receives and plays feature length movies. In one exemplary embodiment, a multifunctional handheld portable cellular device (HPCD) has a body, a display and a processor. The processor plays a feature length movie on the display. The HPCD orders, via a wireless connection to a network, the feature length movie before a public release date of the feature length movie, and plays the feature length movie on the display before the public release date.

Other embodiments and variations of these embodiments are shown and taught in the accompanying drawings and detailed description.

BRIEF DESCRIPTION OF THE DRAWINGS

FIG. 4A is an exemplary screen shot of menu options appearing on a display of a handheld portable electronic device in accordance with an exemplary embodiment of the present invention.

FIG. 4B is an exemplary screen shot of movies available for viewing on a display of a handheld portable electronic device in accordance with an exemplary embodiment of the present invention.

FIG. 4C is an exemplary screen shot of a selected feature length movie beginning to play on a display of a handheld portable electronic device in accordance with an exemplary embodiment of the present invention.

FIG. 5 is an exemplary system showing a networked environment in accordance with an exemplary embodiment of the present invention.

DETAILED DESCRIPTION

Embodiments in accordance with the present invention are directed to apparatus, systems, and methods for transmitting to and playing movies on a handheld portable electronic device (HPED). For convenience of illustration, a handheld portable cellular device (such as an electronic device having cellular telephone capabilities) is illustrated in and discussed in connection with the following figures. Embodiments in accordance with the present invention, though, are not limited to cellular or mobile telephones or any particular type of portable computing device. By way of example, embodiments in accordance with the present invention include, but are not limited to, handheld computing devices, cellular or mobile phones, digital cameras, portable computers (such as notebook computers), handheld audio playing devices (example, handheld devices for downloading and playing music and videos), personal digital assistants (PDAs), combinations of these devices, and other portable electronic devices and systems.

In one exemplary embodiment, the handheld portable cellular device (HPCD) has at least one display for playing feature length movies. In one exemplary embodiment, users that belong to a private release group (PRG) receive access to play or view a feature length movie on the HPED or HPCD before the release date of the feature length movie. Thereafter, the general public can receive access to play or view the feature length movie on their HPEDs or HPCDs on the release date. Feature length movies can be downloaded, transmitted, or broadcast to one or more HPCDs on or before the respective release dates of the feature length movies. In one exemplary embodiment, the feature length movies are stored on the HPCD and available for repeat playing or viewing. In other embodiments, the movies are simply broadcast to the HPCDs, made available for a limited number of viewings, and/or not available for permanent storage on the HPCDs.

Figure 1:
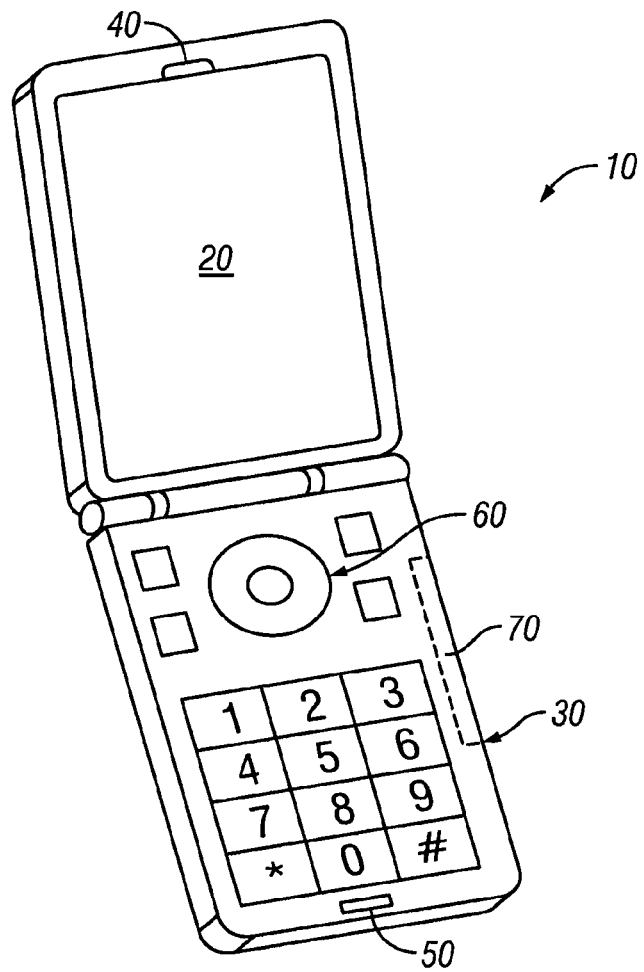
FIG. 1 is a perspective view of an exemplary handheld portable electronic device that uses a remote display in accordance with an exemplary embodiment of the present invention.
Figure 2:
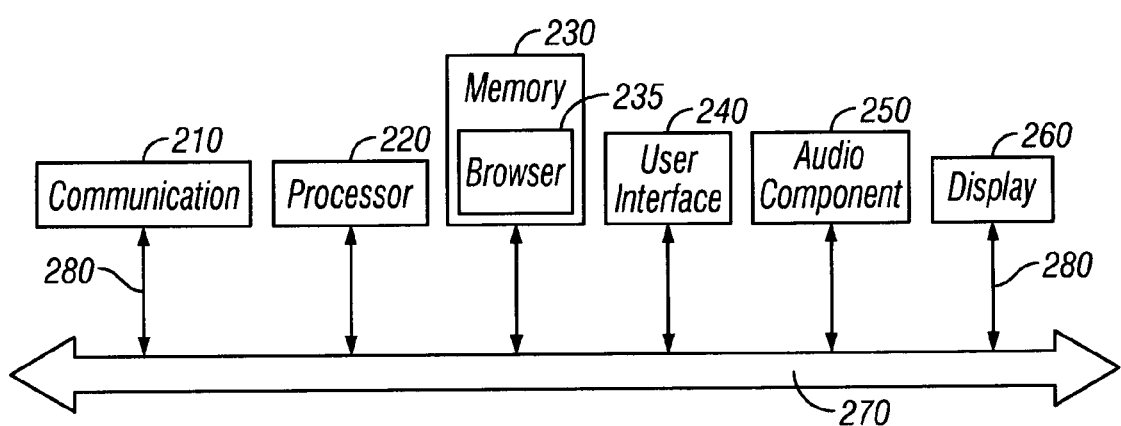
FIG. 2 is a block diagram showing internal components of an exemplary handheld portable electronic device that uses a remote display in accordance with an exemplary embodiment of the present invention.

FIGS. 1 and 2 show an exemplary embodiment of a HPCD 10 in accordance with the invention. In one exemplary embodiment, the HPCD is handheld, portable, and multifunctional. As used herein, a "multifunctional" electronic device is capable of performing more than one function, such as, but not limited to, computing functions, cellular transmissions (i.e., functioning as a cellular telephone), playing audio and/or video (example, playing full length movies), capturing audio and/or video, capturing still images, connecting to and navigating and/or browsing over a network (such as the interne), downloading and/or storing audio and/or video, wirelessly communicating with other electronic devices, etc. Further, plural functions can be simultaneously performed or executed on a multifunctional electronic device (example, a handheld portable electronic device, such a cellular or mobile telephone).

As shown in FIG. 1, in one exemplary embodiment the HPCD 10 includes a display 20, keypad, 30, speaker 40, microphone 50, and a navigational interface 60. The HPCD is a wireless device that communicates using, for example, radio frequency (RF) signals, infrared, etc. Audio, video, and/or data communications are transmitted or broadcast from one or more ports or antennas 70 (shown with dashed lines and as being internal to the device).

In one exemplary embodiment, RF signals are transmitted to and from a transceiver that resides in a remote cellular base station. Thus, during a telephone call, RF signals are communicated from the HPCD 10 to a base station antenna and transceiver located on a tower. Users of the HPCD 10 are thus able to communicate voice and video with other parties at remote locations.

FIG. 2 is a block diagram of the HPCD 10. The HPCD includes a communication system 210, processor 220, memory 230, user interface 240, audio components 250, and display 260 coupled together along a bus 270. The processor or processing unit 220 (such as one or more processors or central processing units, CPUs) controls the overall operation of the device 10. The memory 230 (such as random access memory (RAM) for temporary data storage and read only memory (ROM) for permanent data storage) stores data, control programs, one or more browsers 235, applications, programs, feature length movies, songs and music files, and other data associate with the HPCD 10. The processor communicates with the memory and other components via one or more buses 270 and 280.

In one exemplary embodiment, the communication system includes systems for communicating using one or more media, such as infrared, RF, radio waves (example, wireless WLAN/LAN), and other wireless signals (example, various signals for communicating with wireless networks). For instance, the communication system 210 includes a cellular phone communication system interface that facilitates radio frequency (RF) communications to a cellular base station. When a communication is sent from the cellular device to a base station, the communication system 210 or communication interface formats the communication into a format suitable for broadcasting, such as RF signals. Likewise, when a communication is sent to the cellular device from a base station, the communication system 210 or communication interface formats the communication into a format suitable for further processing by other components residing in the cellular device. Communications transmitted to and received at the cellular device 10 include audio data, video data, and other data and information.

The HPCD 10, though, is not limited to transmitting and receiving RF signals. Other types of signals can also be used to transmit video, audio, and other data. The communication system 210 is configured to receive a variety of signals and convert those signals to an appropriate format for further communication to other devices and displays. The HPCD supports two-way communications with various other electronic devices. Further, the HPCD can simultaneously communicate using multiple different communication signals or media. For instance, the communication system 210 includes interfaces for concurrently communicating with a tower using RF and/or with another electronic device using infrared, radio waves (example, wireless WLAN/LAN), and/or wireless transmissions to connect to a network (such as the internet via a home or office network).

The memory 230 can also include one or more browsers 235 that are software applications used to locate, navigate, and display information (such as web pages) over networks (such as the internet). Graphical browsers display graphics and text and present multimedia information. The multimedia information, for example, includes text, graphics, video, sound, and animation. Further, the memory 230 can include various off-the-shelf software programs, such as those available on a notebook or desktop computer. In this manner, the HPCD is multifunctional and enables users to enter and manipulate data and information (example, using word processing programs or tools).

The user interface 240 is a medium for providing instructions from the user to the processor, browser, etc. For instance, the user can manipulate the keypad 30 and/or navigation interface 60 (see FIG. 1) to interact with the HPCD. Thus, the user interface 240 receives information or commands from the user to control operations of the HPCD 10.

As shown in FIG. 2, the components 210-260 are communicatively coupled together along the communication bus 270 and connections or buses 280. Embodiments in accordance with the invention, though, are not limited to this type or architecture or connectivity. For example, one or more of the above-described components can be directly coupled to each other or coupled to each other through intermediary components.

Figure 3:
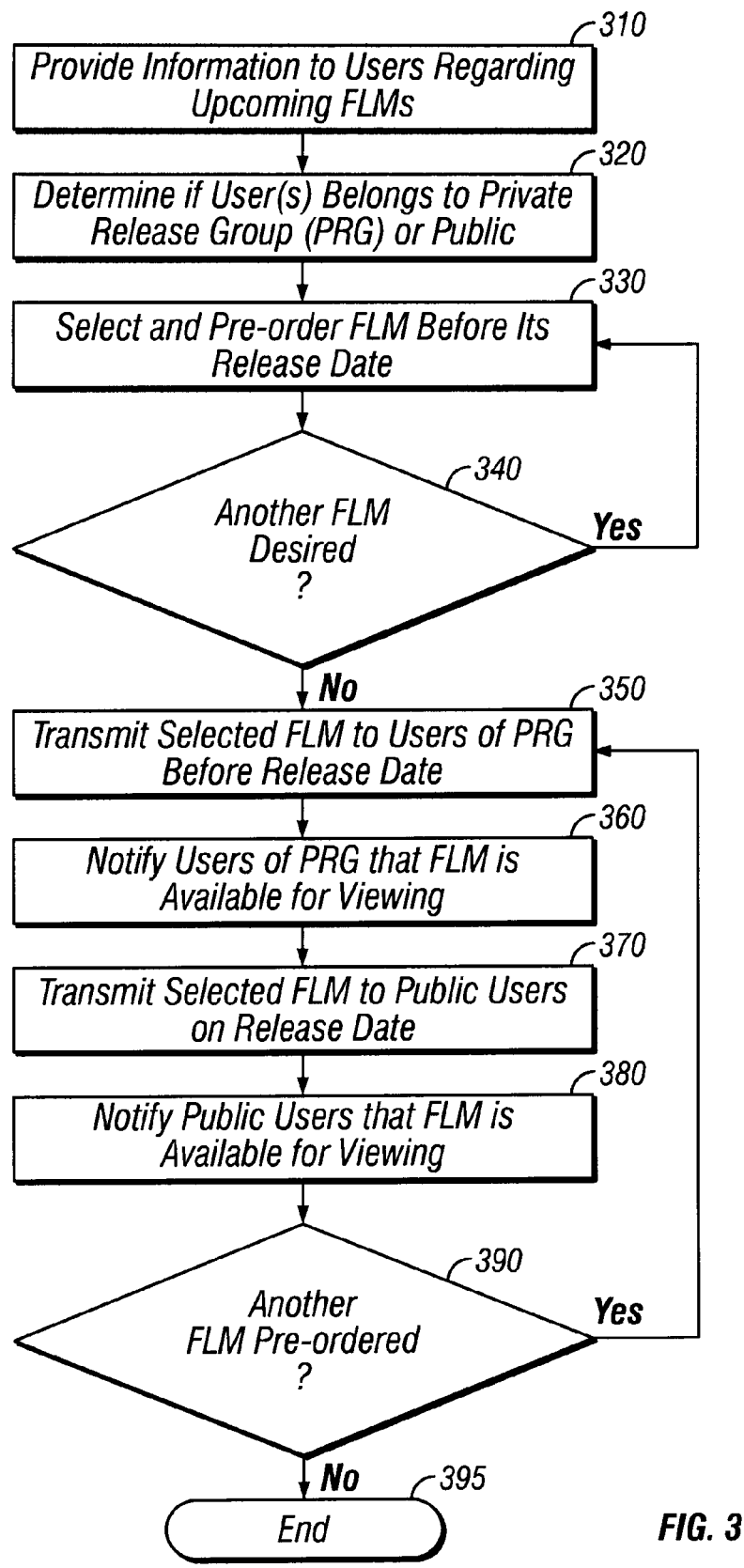
FIG. 3 is a flow diagram for selecting and receiving feature length movies in accordance with an exemplary embodiment of the present invention.

FIG. 3 is a flow diagram 300 for selecting, receiving, downloading, and/or playing feature length movies or films. As used herein, the term "feature length movie" or "feature length film" means a full length motion picture that is greater than sixty minutes in length, but typically between about 90 to 120 minutes. A feature length movie is different than a "short" (i.e., a film less than about 30 to 45 minutes), a "trailer" (i.e., a preview or publicity film lasting under three minutes that includes scenes or advertisements for an upcoming feature length movie), an advertisement, or a music video. Further, the term "motion picture" or "movie" means a film that has sequential mages that when projected create an illusion of movement. Further yet, embodiments in accordance with the present invention include a wide variety of film media developed in the future or now known, such as photographic film (i.e., film stock), digital video, computer animation, and analog video, to name a few examples.

According to block 310, users are provided information regarding upcoming or future feature length movies that are not released. In one exemplary embodiment, users are given information or have access to information about feature length movies that are not yet completed or not yet released to the general public. One skilled in the art appreciates that movie studio and distributors often announce actual or estimated release dates or time periods for feature length movies. For example, a studio may announce that a new feature length movie is a "coming attraction" or "coming this fall" or "coming this summer" or, "coming to a theater near you" etc. New feature length movies can also be given definitive or exact release dates in the future.

Information concerning upcoming feature length movies can be provided to users in a variety of ways using a variety of media. Users can be sent advertisements or announcements about to-be-released feature lengths movies. In one exemplary embodiment, movie trailers, advertisements, or notices are sent to HPCDs of users. For example, a cellular telephone company can send its subscribers information (example, text messages, hyperlinks, or emails) providing a list of upcoming feature length movies and their corresponding release dates. This information, for example, can be sent directly to HPCDs of the subscribers of the cellular telephone company. For instance, users can view of list of upcoming feature length movies and be asked if they want to pre-order or purchase one or more feature length movies in advance of the movie being available for viewing to the general public. If a user selects a movie, the fee for the movie can be added to a monthly invoice for the user. Alternatively, the user could be billed or pay on-demand.

In another exemplary embodiment, a user uses a HPCD to navigate to a network location. For instance, a user interacts with a cellular device to access or browse the internet and navigate to an internet location (example, website, uniform resource locator, etc.). For instance, the user can enter voice commands and/or manipulate the keypad 30 and/or navigation interface 60 (see FIG. 1) to interact with the HPCD to access a location on the World Wide Web. Thus, in one exemplary embodiment, the user interface 240 (FIG. 2) receives information or commands from the user to control operations of the HPCD 10.

According to block 320, a determination is made as to whether a user belongs to a private release group (PRG) or general public. As previously noted, some movie goers place significant value on viewing feature length movies before others. In other words, some movie viewers will pay extra to watch a movie before the movie is available to the general public. In one exemplary embodiment, some users who belong to a PRG can view a feature length movie before the release date. In other words, some users can view the movie before it is available to the general public on the release date.

In one exemplary embodiment, the viewing of feature lengths movies is tied to or associated with the sale of other goods or services. Users in the PRG are able to view the feature length movie before the release date if they buy or use another good or service that is not the feature length movie itself.

As one example, a movie studio or movie distributor partners or contracts with a cellular telephone company so subscribers to the cellular telephone company can view a particular feature length movie before the release date. For instance, assume that movie studio A produces a feature length movie B that is not yet released to the public. Movie studio A and cellular company C decide that cellular phone subscribers to cellular company C have an option to view this feature length movie B before the movie is released to the general public. These cellular subscribers would be given information (see block 310) about upcoming feature length movie B. These cellular subscribers form a PRG since non-subscribers or others in the general public would be denied an opportunity to view the feature length movie B before its release date. Thus, viewing the feature length movie B before its release date is tied to the sale of another product or service (i.e., tied to the sale of cellular services for cellular company C).

As another example, a movie studio or movie distributor partners or contracts with a manufacturer of a HPCD so owners or purchases of the HPCD can view a particular feature length movie before the release date. For instance, assume that movie studio X produces a feature length movie Y that is not yet released to the public. Movie studio X and manufacturer Z of HPCDs decide that purchasers or owners of a Z's HPCD have an option to view this feature length movie Y before the movie is released to the general public. Users of these HPCD would be given information (see block 310) about upcoming feature length movie X. Owners of these HPCDs form a PRG since non-owners or others in the general public would be denied an opportunity to view the feature length movie Y before its release date. Thus, viewing the feature length movie Y before its release date is tied to the sale of another product or service (i.e., tied to the sale of Z's HPCD).

According to block 330, a user selects a feature length movie before its release date. As used herein, the term "public release" means the first distribution to the general public for viewing the feature length movie. The term "public release date" means the calendar date or day on which the public release occurs. As used herein, the term "private release" means the first distribution to a selected group or portion of the general public for viewing the feature length movie, the selected group being required to purchase a service or product that is not the feature length movie itself. The term "private release date" means the calendar date or day on which the private release occurs.

The release of a feature length movie can even occur nationally (i.e., across the United States) at the same specified time. In one exemplary embodiment, a user selects a feature length movie that has not yet been distributed to the general public for showing in movie theaters, from DVDs, on television, and/or on the internet.

In one exemplary embodiment, a user pre-orders, pre-purchases, or buys the feature length movie before its release date in order to ensure that the user receives the feature length movie on or before the actual release date. As noted, some users are eligible to view the feature length movie before the release date since such users are part of the selected group that purchases goods or services other than the feature length movie itself. By way of example, a user accesses the internet using a HPCD and navigates to a retail store or web site. Here, the user orders a feature length movie that has not yet been released. The user is not sent the movie on the date at this time (i.e., the order date) since the order date occurs before the release date. At this time, the feature length movie may not even be completed (i.e., ready for distribution) or may be completed but not yet released on DVD, released in theaters and/or otherwise available to the general public. Instead, the movie is broadcast, sent, made available, or transmitted to the user in the future on or before the actual release date. By pre-ordering the movie, the user is ensured, authorized, or guaranteed to receive or view the feature length movie on or before the release date since it was ordered on or before the release date.

According to block 340, a question is asked: Does the user desire another feature length movie? In other words, the user can pre-order or buy multiple different feature lengths movies before their release dates. Of course, each movie may have a different release date that will occur at different dates in the future. If the answer to this question is "yes," then flow proceeds back to block 330 and the user selects another feature length movie. If the answer to this question is "no," then flow proceeds to block 350.

One skilled in the art will appreciate that users can pay for the selected feature length movies at various times and with various method of payment. In one exemplary embodiment, the user pays for the movies on the order date, which is before the release date of the feature length movies. In other exemplary embodiments, users can pay for feature length movies when they are ordered, when they are delivered to the user, when the release date occurs, when they are actually watched, etc.

According to block 350, a selected feature length movie is sent, transmitted, made available, broadcast, or delivered to users of a private release group (PRG) before the release date. In other words, a private release of the feature length movie occurs on the private release date. The PRG is a selected group or portion of the public that paid an extra fee (example, purchased a service or product that is not the feature length movie itself). As noted above for example, such PRG includes cellular subscribers who subscribe to a particular cellular company or cellular service. As another example, such PRG includes people who bought a specific make or model HPCD from a particular manufacturer. As another example, such PRG include people who paid a fee above the fee for watching or buying the feature length movie. As another example, such PRG includes people who belong to or are members at a certain club or organization.

In one exemplary embodiment, the feature length movie is sent, transmitted, made available, broadcast, or delivered a specified computer or the HPCD before the release date for the feature length movie. In one exemplary embodiment, the feature length movie is wirelessly transmitted or wirelessly sent to the HPCD of the user. For instance, at the time the feature length movie is ordered, the user can specify or designate one or more computers, email addresses, HPCDs, and/or handheld portable electronic devices for receiving the feature length movie before its release date. Embodiments in accordance with the present invention, though, are not limited to transmitting the feature length movie before its release date to a HPCD. For example, a user can specify information (example, network address, email address, web site, phone number, etc) to indicate a specific location, server, HPED, or computer for receiving the feature length movie before its release date. For example, a user can navigate to the retail store using a notebook computer, pre-order the feature length movie, and specify that the movie be transmitted to a designated HPCD before the release date. As another example, a user can navigate to a web site using a cellular phone, buy the feature length movie before its release date, and specify an email address or network location where the movie is sent before its release date. Once the feature length movie is available, the user could then access the email account or network location with a computer or handheld portable electronic device to retrieve (example, via an email or hyperlink) the feature length movie.

As yet another example, users can designate a time for receiving the feature length movie before the release date. For instance, a user may select a specific time of day, example 7:00 p.m. to receive the feature length movie. At 7:00 p.m. before the release date, the feature length movie is broadcast to the HPCD of the user. The user can thus designate a specific time to watch the movie before the release date. Further, the feature length movie may or may not be downloaded to the HPCD. The user can be sent (example, via broadcasting or multicasting) a message or notice before the designated time as a reminder that the feature length movie will begin to play at the designated time. At this designated time, the feature length movie can be automatically sent or broadcast to the HPCD.

In one exemplary embodiment, the feature length movie is automatically and wirelessly transmitted to the HPCD before the release date. As an example, the user uses a HPCD to access the network location and select and pre-order a feature length movie before its release date. Later, before the release date, the selected movie is automatically transmitted or downloaded to the same HPCD used to select and pre-order the feature length movie.

According the block 360, the user is notified that the feature length movie is available for viewing. For instance, a notice can be sent to the user's email account, computer, handheld portable electronic device, etc. Users can be notified in a wide variety of ways. By way of further example, a message or notification is sent to a display of a HPCD reminding or informing the user that the feature length movie is ready for viewing or downloading. As another example, an automatic voice message, email, or text message is sent to a HPCD, HPED, or email account to notify the user.

According to block 370, a selected feature length movie is sent, transmitted, made available, broadcast, or delivered to public users on the public release date. In other words, a public release of the feature length movie occurs. In one exemplary embodiment, the public users do not include the users who formed part of the PRG.

In one exemplary embodiment, the feature length movie is transmitted, made available, broadcast, or delivered to the users to a specified computer or the HPCD on the release date for the feature length movie. In one exemplary embodiment, the feature length movie is wirelessly transmitted or wirelessly sent to the HPCD of the user. For instance, at the time the feature length movie is ordered, the user can specify or designate one or more computers, email addresses, HPCDs, and/or handheld portable electronic devices for receiving the feature length movie on its release date. Embodiments in accordance with the present invention, though, are not limited to transmitting the feature length movie on its release date to a HPCD. For example, a user can specify information (example, network address, email address, web site, phone number, etc) to indicate a specific location, server, HPED, or computer for receiving the feature length movie on its release date. For example, a user can navigate to the retail store using a notebook computer, pre-order the feature length movie, and specify that the movie be transmitted to a designated HPCD on the release date. As another example, a user can navigate to a web site using a cellular phone, buy the feature length movie before its release date, and specify an email address or network location where the movie is sent on its release date. Once the feature length movie is available, the user could then access the email account or network location with a computer or handheld portable electronic device to retrieve (example, via an email or hyperlink) the feature length movie.

As yet another example, users can designate a time for receiving the feature length movie on the release date. For instance, a user may select a specific time of day, example 7:00 p.m. to receive the feature length movie. At 7:00 p.m. on the release date, the feature length movie is broadcast to the HPCD of the user. The user can thus designate a specific time to watch the movie on the release date. Further, the feature length movie may or may not be downloaded to the HPCD. The user can be sent (example, via broadcasting or multicasting) a message or notice before the designated time as a reminder that the feature length movie will begin to play at the designated time. At this designated time, the feature length movie can be automatically sent or broadcast to the HPCD.

In one exemplary embodiment, the feature length movie is automatically and wirelessly transmitted to the HPCD on the release date. As an example, the user uses a HPCD to access the network location and select and pre-order a feature length movie before its release date. Later, on the release date, the selected movie is automatically transmitted or downloaded to the same HPCD used to select and pre-order the feature length movie.

According the block 380, the user is notified that the feature length movie is available for viewing. For instance, a notice can be sent to the user's email account, computer, handheld portable electronic device, etc. Users can be notified in a wide variety of ways. By way of further example, a message or notification is sent to a display of a HPCD reminding or informing the user that the feature length movie is ready for viewing or downloading. As another example, an automatic voice message, email, or text message is sent to a HPCD, HPED, or email account to notify the user.

Once the feature length movie is downloaded or otherwise available for viewing, the user can watch the feature length movie on a display. By way of example, the user can order the feature length movie with HPCD 10 (FIG. 1). On the designated date (i.e., on the release date), the movie is automatically transmitted to, made available for viewing to, and/or downloaded to the HPCD. Thereafter, the user can navigate menu options to select and watch the feature length movie on the display 20.

According to block 390, a question is asked: Is another feature length movie pre-ordered? If the answer to this question is "yes," then flow proceeds back to block 350. The user would then receive the next selected or ordered feature length movie on or before its release date (depending on whether the user was part of the PRG). If the answer to this question is "no," then flow proceeds to block 395 and the process ends.

FIG. 4A is an exemplary screen shot 400 of menu options appearing on a display of a handheld portable electronic device in accordance with an exemplary embodiment of the present invention. By way of example, the menu options include call history, contacts, movies, internet, etc. The menu option "movies" 415 is highlighted or otherwise selected. Selection of this menu option instructs the electronic device to list movies available for viewing and/or stored in memory. In one exemplary embodiment, a user uses voice commands or drilldown techniques to further generate and select menu options (example, using the user interface 240 of FIG. 2).

FIG. 4B is an exemplary screen shot 430 of menu options for various movies available for viewing and/or stored in memory on the handheld portable electronic device. For illustration, three feature length movies (FLM) 440A, 440B, and 440C are shown as being stored and/or available for viewing. For illustration purposes, the menu option "FLM #1" 440A is highlighted or otherwise selected on the display of the handheld portable electronic device.

FIG. 4C is an exemplary screen shot 450 showing a movie commencing to play on a display. Since movie "FLM #1" 440A was selected in connection with FIG. 4B, the movie "FLM #1" begins to play on the handheld portable electronic device.

Upon reading this disclosure, one skilled in the art will appreciate that various embodiments exist in accordance with the present invention. FIG. 5 illustrates one of many such embodiments as a system 500. The system may include one or more networks, such as wireless network 510 and network 512, each of which includes one or more electronic devices or computers. Those skilled in the art will appreciate, one or more LANs may be included (not shown) with each LAN having one or more computers coupled to a host processor. For example, the networks 510 and 512 can have a variety of electronic devices, such as mainframe computers or servers (shown as a gateway computer 520, an application server 522, and a database or a data repository 524). The gateway computer 520 provides an entry point into each network 512. The gateway 520 also couples to network 510 via communication link 526. The gateway 520 also directly or indirectly couples to one or more computers 540 using, for example, a communications link 542. Further, plural wireless electronic devices are shown as a notebook computer 550, a cellular device 552, and a handheld portable electronic device (HPED) 554. These devices wirelessly communication via communication lines 560 to network 510.

Those skilled in the art will appreciate that the gateway computer 520 may be located a great geographic distance from the network 510. Further the computers 540 and electronic devices 550, 552, and 554 can be remote from networks 510 and 512. Further, these computers and devices can connect to the networks using a networking protocol such as the Transmission Control Protocol/Internet Protocol ("TCP/IP") over a number of alternative connection media, such as cellular phone, radio frequency networks, satellite networks, etc. The wireless network 510 can connect to the gateway 520 using various network connections, such as TCP or UDP (User Datagram Protocol) over IP, Frame Relay, ISDN (Integrated Services Digital Network), PSTN (Public Switched Telephone Network), just to name a few examples.

Thus, embodiments in accordance with the present invention include connections using wireline connections and/or wireless connections. Wireline connections are those that use physical media such as cables and telephone lines. By contrast, wireless connections use media such as satellite links, radio frequency waves, and infrared waves, for example. Many connection techniques can be used with these various media, such as using modems, cable connections, telephone lines, DSL, satellite, LAN cards, and cellular modems, just to name a few examples.

The networks 510 and 512 can have various embodiments and still be within embodiments in accordance with the present invention. For instance, such networks include, but are not limited to, one or more of computing networks or other types of digital networks, such as a digital telephony network, a digital television network, or a digital cable network, to name a few examples. Similarly, a gateway or server can be one of any number of different types of computers that have processing and communication capabilities. Various alternatives for connecting servers, computers, and networks will not be described as such alternatives are known in the art.

As mentioned, handheld portable electronic devices (example, cellular devices) include a communication interface to support bi-directional communications with various networks, computers, electronic devices, and other handheld portable electronic devices. Various types of communication interfaces and data formats, now known or later developed, can be used to establish communication between these devices. As example, the handheld portable electronic device can utilize Bluetooth and/or any one of various standards for wireless local area networks (WLAN) based on, for example, IEEE 802.11 or specifications developed in the future. For instance, Wi-Fi enables a user of the handheld portable electronic device to connect to the internet when the device is in proximity of an wireless access point (WAP). The handheld portable electronic device can thus use Wi-Fi to communicate with the remote devices. As another example, various types of cellular telephone networks can be utilized to provide communications between the handheld portable electronic device and the remote device(s). By way of example only, the handheld portable electronic device can utilize global system for mobile communications (GSM), universal mobile telecommunications systems (UMTS), and/or code division multiple access (CDMA) to communicate with the remote devices(s). Thus, by way of example, communications between the handheld portable electronic device and remote devices include, but are not limited to, any one or more of direct cable link, Bluetooth, Wi-Fi, infrared links, cellular networks, short messaging service (SMS), wireless access protocol (WAP), firewire link, serial link, other wired and wireless links, etc.

In one exemplary embodiment, one or more blocks in the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory (such as memory of the handheld portable electronic device) and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A handheld portable electronic device (HPED), comprising:
a body having a display; and
a processor for playing a feature length movie on the display, wherein the HPED purchases and downloads to the HPED, via a wireless connection to a network, the feature length movie before a public release date of the feature length movie, and plays the feature length movie on the display before the feature length movie is publicly available for viewing by a general public in movie theaters, wherein a private release group of the general public purchases and plays the feature length movie on HPEDs before the feature length movie is publicly available for viewing in the movie theaters, the feature length movie is subsequently available for viewing by the general public in the movie theaters after being played on the HPEDs, and each of users in the private release group designates specific times when the feature length movie plays on the HPEDs before the feature length movie is publicly available for viewing by the general public in the movie theaters.

2. The HPED of claim 1, wherein the feature length movie is played on the display before the feature length movie is publicly available for viewing in the movie theaters only if the HPED is manufactured by a specific manufacturer of handheld portable electronic devices.

3. The HPED of claim 1, wherein the feature length movie is played on the display before the feature length movie is publicly available for viewing in the movie theaters only if the HPCD uses cellular services of a specific cellular telephone company.

4. The HPED of claim 1, wherein the feature length movie is played on the display before the feature length movie is publicly available for viewing in the movie theaters if an extra fee is paid, the extra fee being separate from a fee for buying or viewing the feature length movie.

5. The HPED of claim 1, wherein the feature length movie is played on the display before the feature length movie is publicly available for viewing in the movie theaters if a user of the HPED purchases a product other than the feature length movie such that purchasing of the product and viewing of the feature length movie are tied together.

6. The HPED of claim 1, wherein the feature length movie is played on the display before the feature length movie is publicly available for viewing in the movie theaters only if a user of the HPED purchases a service that is separate from the feature length movie such that purchasing of the service and viewing of the feature length movie are tied together.

7. The HPED of claim 1, wherein the feature length movie is delivered to the HPED before the feature length movie is publicly available for viewing in the movie theaters at an email address specific time of day that is specified by a user of the HPED.

8. A multifunctional handheld portable electronic device (HPED), comprising:
a display;
a memory storing a browser; and
a processor for executing the browser to access an internet location and purchase and download, at the internet location, a feature length film that is not yet publicly available for viewing on digital video disks (DVDs) and in movie theaters, wherein the feature length film first becomes available for viewing on the display before a day that the feature length film is publicly available for viewing by a general public on the DVDs and in the movie theaters, and the feature length film is sold to HPEDs of a private release group and viewed on the HPEDs of the private release group before the day that the feature length film is publicly available for viewing by the general public on the DVDs and in the movie theaters, the feature length film subsequently has a public release to the general public in the movie theaters and the DVDs after being played on the HPEDs, and each of users in the private release group determines a time when the feature length movie plays on the HPEDs before the day that the feature length film is publicly available for viewing by the general public on the DVDs and in the movie theaters.

9. The HPED of claim 8, wherein viewing of the feature length film on the HPED before the feature length film is publicly released to the general public in the movie theaters and the DVDs is tied to a purchase by the private release group of a product other than the feature length film.

10. The HPED of claim 8, wherein the users in the private release group pre-order the feature length film before the feature length film is completed.

11. The HPED of claim 8, wherein the feature length film is played on the display before the feature length movie is publicly available for viewing in the movie theaters only if the HPCD uses cellular services of a specific cellular telephone company.

12. The HPED of claim 8, wherein the HPED accesses the feature length film through a link in an email before the day that the feature length film is publicly available for a first time for viewing on the DVDs and in the movie theaters.

13. The HPED of claim 8, wherein the feature length film is played on the display before the feature length movie is publicly available for viewing in the movie theaters if the users of the HPEDs purchase a particular HPED such that viewing of the feature length movie is tied to the purchase of the particular HPED.

14. The HPED of claim 8, wherein a notice automatically appears on the HPED to notify a member of the private release group that the feature length film is available for viewing, the notice appearing on the display before the day that the feature length film is publicly available for a first time for viewing on the DVDs and in the movie theaters.

15. A method of software execution, comprising:
accessing, with a handheld portable electronic device (HPED), a network location to purchase and download a feature length movie before a release date of the feature length movie to a general public in movie theaters; and
displaying, for a first time before the release date to the general public in the movie theaters, the feature length movie on a display of the HPED, wherein the feature length movie is sold to and viewed by a group of the general public before the release date in the movie theaters if the group of the general public plays the feature length movie on HPEDs, and the feature length movie is subsequently available for viewing by the general public on the release date in the movie theaters, wherein the group of the general public is a private release group, and the feature length movie is delivered to the HPED before the release date in movie theaters at a specific time of day that is specified by a user of the HPED.

16. The method of claim 15, wherein users in the group of the general public are denied an opportunity to view the feature length movie on the HPEDs before the feature length movie is publicly available for viewing by the general public on the DVDs and in the movie theaters unless the users in the group of the general public purchase the product from a cellular company.

17. The method of claim 15 further comprising, providing before the release date a hyperlink to watch the feature length movie on the HPED.

18. The method of claim 15 further comprising, providing a notice on the display of the HPED before the release date to notify that the feature length movie is available for viewing.

19. The method of claim 15 further comprising, automatically transmitting the feature length movie to the HPED before the release date.

20. The method of claim 15 wherein the feature length movie is a motion picture having a runtime that is greater than ninety minutes.

21. A handheld portable device (HPD), comprising:
a display;
a memory that stores programming code; and
a processor that executes the programming code to purchase over an internet a product and download to the HPD a feature length movie that is not yet publicly available for viewing by a general public on digital video disks (DVDs) and in movie theaters, and play the feature length movie on the display before the feature length movie is publicly available for viewing by the general public on the DVDs and in the movie theaters, wherein a group of the general public plays the feature length movie on HPDs before the feature length movie is publicly available for viewing by the general public on the DVDs and in the movie theaters if the group of the general public purchases both the product and the feature length movie since the product and the feature length movie are tied together, and the feature length movie is subsequently released to the general public in the movie theaters after being played on the HPDs, and users in the group designate specific times when the feature length movie plays on the HPDs before the feature length movie is publicly available for viewing by the general public on the DVDs and in the movie theaters.

22. The HPD of claim 21, wherein users in the group of the general public are denied an opportunity to view the feature length movie on the HPDs before the feature length movie is publicly available for viewing by the general public on the DVDs and in the movie theaters unless the users in the group of the general public purchase the product from a cellular company.

* * * * *